United States Patent [19]

Auberon et al.

[11] Patent Number: 4,549,919
[45] Date of Patent: Oct. 29, 1985

[54] PROCESS FOR PROVIDING A METAL CONNECTOR FIXED TO A PIPE OF COMPOSITE MATERIAL AND PIPE THUS MADE

[75] Inventors: Marcel Auberon, Le Haillan; Daniel Cabanel, Merignac; Michel Dolbeau, Cestas; Albert Phan, Saint-Aubin-de-Medoc; Philippe Pillois, Saint-Medard-en-Jalles; Claude L. Bournazel, Cernay-la-Ville; Michel Huvey, Bougival, all of France

[73] Assignees: Societe Nationale Industrielle et Aerospatiale, Paris; Institut Francais du Petrole, Hauts-de-Seine, both of France

[21] Appl. No.: 395,791

[22] Filed: Jul. 6, 1982

[30] Foreign Application Priority Data

Jul. 6, 1982 [FR] France .............................. 81 13232

[51] Int. Cl.[4] ........................................... B65H 81/00
[52] U.S. Cl. .................................. 156/172; 156/185; 156/187; 156/294; 285/239; 285/254; 285/259
[58] Field of Search ................................. 156/171–173, 156/185, 187–188, 191–192, 293, 294; 285/239–242, 256, 259, 254

[56] References Cited

U.S. PATENT DOCUMENTS

| 909,003 | 11/1909 | LePage | 285/254 X |
| 1,942,829 | 1/1934 | Pentz | 285/84 |
| 2,427,685 | 9/1947 | Midtlyng | 285/254 X |
| 2,944,839 | 7/1960 | Anderson | 285/291 X |
| 3,467,764 | 9/1969 | Knapp | 285/239 X |
| 4,124,422 | 11/1978 | Kusano | 156/172 X |

FOREIGN PATENT DOCUMENTS

| 1140958 | 3/1957 | France . |
| 2242213 | 8/1974 | France . |
| 2457999 | 5/1980 | France . |

Primary Examiner—David Simmons
Attorney, Agent, or Firm—Armstrong, Nikaido, Marmelstein & Kubovcik

[57] ABSTRACT

There is provided a process for providing a metal connector fixed to a pipe of composite material and a pipe thus made.

A pipe carries at one of its extremities a metal connector, and a first film of elastomer being interposed between the two and adhering to each of them an adhesive. At the level of this extremity, the pipe also carries a metal casing which is held solidly on the connector by a band and a second film of an elastomer which is interposed between the casing and the pipe and adheres by means of an adhesive to each of them.

The pipes according to the invention are suitable for use in offshore oil exploration.

22 Claims, 1 Drawing Figure

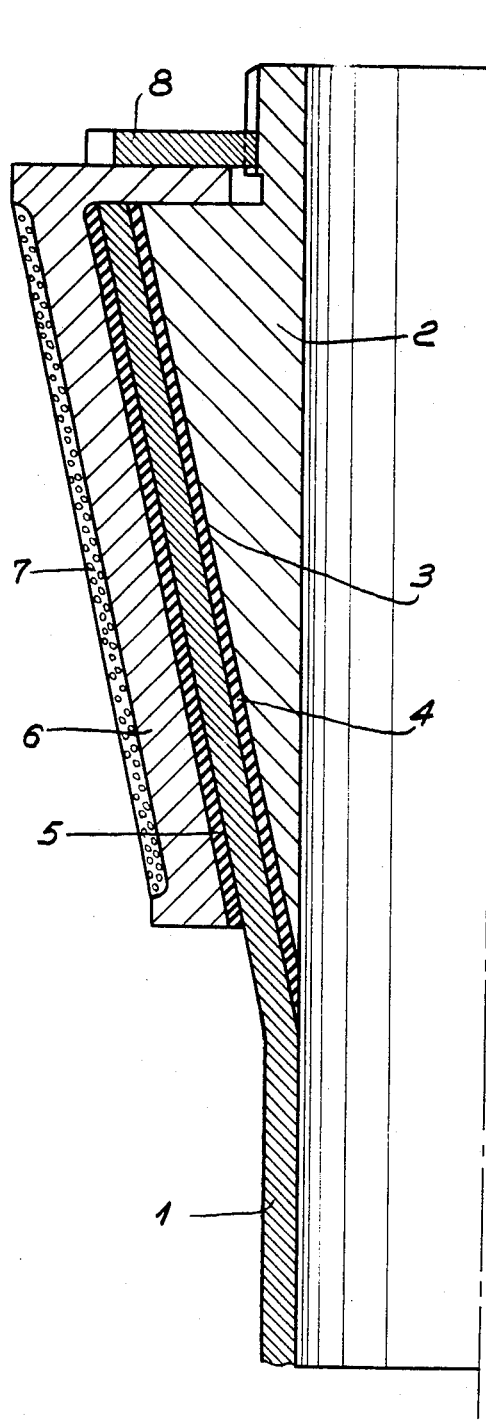

PROCESS FOR PROVIDING A METAL CONNECTOR FIXED TO A PIPE OF COMPOSITE MATERIAL AND PIPE THUS MADE

The present invention relates to a process for providing a metal connector fixed to a pipe of a composite material i.e. fibers such as glass fibers, carbon fibers, impregnated with a resin, for instance an epoxy-resin and to pipes thus made. Such pipes of composite material are intended to be used particularly in offshore oil exploration.

In this particular application, the pipes and their connectors must be resistant to the tractional forces which may reach, under the normal conditions of use, in the region of 1 million Newtons; for this reason it is still preferred at present to use metal pipes with metal connectors whose resistance to such loads is accurately known. In fact it can be calculated that the tractional flux, expressed by the formula $T/\pi D$, in which T is the tractional force and D the diameter of the pipe, may reach in this application about 3,500,000 Newtons/metre.

In an application such as offshore oil exploration, pipes of composite material provided with metal connectors whose performance may be comparable to that of actual metal pipes possess certain advantages particularly due to their resistance to fatigue and to corrosion and their lower weight.

Unfortunately up to now it has only been possible to make such pipes for uses employing low tractional fluxes.

Industrial processes for making pipes of composite material having metal connectors are known.

According to a first process, metal turned flanges are disposed on collars which are mounted on and adhered to pipes of composite material in order to fix the connectors. The pipes are then connected by bolting of the flanges as in conventional metal pipes. However such pipes can only be used under low constraints and particularly when the tractional flux scarcely exceeds 500,000 Newtons per metre.

According to a second process there are provided on the internal walls of the metal connectors circular grooves of predetermined shape and these connectors are mounted on tubes of not yet polymerised composite material. The fixing of the connectors on the pipes is effected by polymerisation of the composite material and by the application at the level of the join of the connectors and pipes, with appropriate means, of pressure in order that the composite material is forced into the grooves in the connectors. The metal connectors are thus obtained integral with the pipes and maintained in place mechanically by means of the grooves filled with composite material. Although this process confers on these pipes resistance characteristics superior to those of the first process, the limits of resistance of the materials used, in particular the fibres and resins constituting the composite material, do not permit, in the region of the metal connectors, withstanding of tractional fluxes, exceeding 1 million Newtons/metre.

In addition, pipes of composite material with connectors also of composite material do not allow in any case the required performances under such loads to be attained.

Therefore, an aim of the present invention is a process which enables a metal connector fixed to a pipe of composite material to be provided.

An object of the invention is a pipe composite material which carries at least one metal connector and of which the characteristics of resistance, particularly under traction, are considerably improved.

Such a pipe permits the replacement of the metal pipe currently used by pipes of composite material provided with metal connectors according to the process of the present invention.

A further aim of the present invention is the providing of a process for making such pipes of composite material having at least one metal connector in simple and industrially applicable fashion.

The objects and these aims, as well as others which will appear in the following, are attained, according to the present invention, by a process for providing at least one metal connector fixed to a pipe of composite material, which process comprises the following steps:

(a) applying adhesive to the external surface of the metal connector destined to be in contact with the pipe of composite material;

(b) after drying the adhesive, placing a film of elastomer over the adhesive;

(c) in a chamber, in which the metal connector from step (b) is placed, simultaneously vulcanizing elastomer of the said film and the curing the adhesive;

(d) applying a layer of adhesive to the surface of the said film of elastomer to be in contact with the pipe of composite material;

(e) after drying the adhesive, forming over this layer a pipe of not yet polymerised composite material.

This process can also comprise a further step (f) during which the assembly from step (e) is pre-polymerised.

In order to ensure good adhesion, before application of the adhesive layer the surface of the metal connector in step (a) should be suitably cleaned and degreased. Similarly the surface of the elastomer film should suitably be degreased before application of the adhesive in step (d).

Advantageously, the drying of the adhesive applied in steps (a) and (d) is carried out in the absence of dust.

Preferably a vacuum is created and maintained in the chamber during the whole of step (c).

Advantageously, the adhesive used during the different steps of the process is of epoxy type.

Preferably at the end of step (d) the metal connector is placed on a mandrel.

According to one embodiment of the present invention, there is placed on the internal wall of a casing a second film of an elastomer as described above. This casing may be of metal and constituted by a plurality of segments.

Advantageously, the casing is held solidly on the connector by means of a locking ring.

After having coated the internal surface of this second film with adhesive, this casing is placed around the tube at the level of the metal connector and held firmly thereon in particular by circumferential winding of a band.

According to another embodiment of the present invention, this process for providing at least one metal connector fixed to a pipe of composite material comprises the following steps:

(a) applying adhesive to the external surface of the metal connector destined to be in contact with the pipe of composite material;

(b) after drying the adhesive, placing a film of elastomer over the adhesive;

(c) in a chamber, in which the metal connector from step (b) is placed, simultaneously vulcanizing the elastomer of the said film and the curing the adhesive;

(d) applying a layer of adhesive to the surface of the said film of elastomer to be in contact with the pipe of composite material;

(e) after drying the adhesive, forming over this layer a pipe of not yet polymerised composite material; and (f) polymerising the assembly from step (e).

The pipe which thus bears a metal connector—in the case where it carries two, the operations described above are carried out simultaneously at each end of the pipe—is placed in an oven in order to polymerise the composite material.

The invention also provides a pipe of composite material having fixed thereto at least one metal connector, the pipe and metal connector having therebetween a film of an elastomer, which adheres to them both.

Advantageously, the adherence between the said film of elastomer and the metal connector on the one hand and the pipe of composite material on the other hand is achieved by an adhesive which may be of epoxy type.

According to another embodiment of the invention, this pipe carries a casing which surrounds it at the level of the metal connector, a second film of an elastomer being interposed between the casing and the pipe itself.

Preferably, this second film is adhered to the internal wall of the casing and the exterior surface of the pipe, particularly by the use of an adhesive which may be of epoxy type.

Preferably a band, for example of glass fibre, is placed around this casing in order solidly to hold the segments constituting it together and to maintain it against the pipe.

The description, which follows and which is not limitative in character, enables the man skilled in the art to understand how the present invention may be put into operation. It must be read together with the accompanying drawing which represents a longitudinal section through half of a pipe of composite material comprising a metal connector.

Thus there can be seen in this drawing, a pipe 1 of composite material provided at one of its extremities with a metal connector 2 shaped substantially like a truncated cone according to this embodiment.

Between the external surface 3 of this connector 2 and the internal wall of pipe 1 is a film 4 of an elastomer which adheres to this external surface.

Thus the bond between the metal connector 2 and the composite material constituting the pipe 1 is effected by the film 4 of an elastomer which is interposed between them.

This film 4 of an elastomer brings to the bond made the necessary suppleness to diminish the tractional flux and progressively transmit forces between the metal connector 2 and the pipe 1 of composite material.

If necessary, in order further to improve performance, the pipe 1 also comprises at the level of its bond with the metal connector 2, another film 5 of an elastomer which adheres to its external wall, the assembly thus formed being enclosed in two half casings 6 held solidly together and on this film 5 by suitable means.

In order to render these two half casings 6 which may be of metal, solidly one with the other and to maintain them securely against the film 5, winding 7 is provided around them, which winding is constituted for example of glass fibre.

According to this embodiment, the pipe 1 is thus held by adhesion between two films 4 and 5 of elastomer which are themselves adhered the one 4 to the connector 2, the other 5 to the half casings 6, the whole being held solidly together on the one hand by winding 7 and on the other hand, against axial movement, by an appropriate disposition such as a locking ring 8.

In addition to the above, the present invention also provides a process for providing a pipe of composite material which carries at least one metal connector.

The first step of this process or step (a) consists in coating the external surface 3 of the metal connector 2 with a first adhesive after having rendered it clean and capable of receiving an application of adhesive as is customary in adhesive operations; according to one method of carrying out this is effected by light sanding and then by degreasing with methyl ethyl ketone.

The adhesive used is for example of epoxy type enabling the adhering of an elastomer to a metal surface.

After drying of this first adhesive in the absence of dust, in a second step (b) a first film 4 of elastomer is placed over this layer of adhesive. The thickness of this film varies, as a function of thickness of the pipe and the required performance, between 0.5 and 5 millimetres.

In the step (c) there is carried out simultaneously in an oven at about 160° C., after having placed the thus coated metal connector 2 in an enclosure in which a vacuum is created and maintained during the whole step, on the one hand, the vulcanizing of the elastomer constituting the film 4 and, on the other hand, the curing of the first adhesive.

At the end of this step (c), the metal connector 2 thus obtained is mounted firmly on a mandrel (not shown in the drawing) which serves for application of the layers of composite material to constitute the pipe 1. In this embodiment, this is achieved by application of filamentary winding. In the course of the step (d) the exterior surface of the first film 4 of elastomer is degreased, for example with methyl ethyl ketone. Then adhesive is applied to this exterior surface and left to dry. The step (d) consists thus of the preparation of the exterior surface of the first film 4 and of its coating with a connecting compound such as an adhesive.

In the course of the following step (e), one proceeds to the winding of pipe 1 by recovering of the external surface of the first film 4 of elastomer in proportion to the filamentary layers constituting the pipe 1. When the predetermined number of layers of composite material have been applied, there is carried out in the step (f) a pre-polymerisation of the material in a conventional oven at about 120° C. There is thus effected the adhesion of the composite material to the external surface of the first film 4 of elastomer.

In a parallel manner to the steps (a) to (e) described above, the internal wall of a casing constituted by two segments or half casings 6 is coated with a second film 5 of elastomer according to the same method of operation as that used for coating the metal connector 2.

When the composite material of pipe 1 has been pre-polymerised and the bond with the metal connector formed and when the two half casings 6 have their internal wall covered by adhesion of the second film 5 the internal surface of this film is degreased for example using methyl ethyl ketone in the same manner as the external wall of pipe 1. Further adhesive for example that described in the course of step (a) is applied to the degreased surfaces of the two half casings 6. After drying, these two half casings are mounted around the pipe 1; which is thus placed between them and the metal connector 2. The assembling is completed, according to this embodiment, by the putting into place of a locking ring 8 intended to hold solidly the casing 6 on the metal connector 2. The fixing of the two half casings 6 on the pipe 1 at the level of the metal connector 2 integral with the composite material is completed by circumferential winding of a band 7 constituted by composite material of the same kind as that used to make the pipe 1 according to this embodiment of the invention.

The complete pipe, constituted by its present part 1, metal connector 2, half casings 6 and band 7 is again heated to about 160° C. in order to polymerise the composite material, the band and the adhesive assuring the join between the composite material and the half casings 6.

The system of fastening, with which the metal connector may be provided, enables the adopting for holding two tubes solidly together various systems such as those of screwing and catches.

The step (f) of pre-polymerisation of the composite material can be omitted : in this case the composite material is polymerized where the complete tube, constituted by its present part 1, metal connector 2, half casings 6 and hand 7, is heated to about 160° C.

According to another embodiment of the present invention, the process comprises steps (a) to (e) as described hereinabove and a step during which the composite material is polymerised. Consequently, the tube embodies neither casing nor band.

The process according to the present invention enables the making of pipes of composite material comprising metal connectors which are particularly well adapted to offshore oil exploration which have the same properties as the composite material; lower weight, good resistance to fatigue and to corrosion. For this reason the pipes may be used for offshore drilling where their advantages in comparison to metal pipes are important when working at great depths. However, their industrial use is advantageous whenever a user seeks an improved weight performance ratio.

As well as the embodiment described above relative to the joining of a pipe of composite material and at least one metal connector, the providing of a metal

We claim:

1. Process for providing at least one metal connector fixed to a pipe of composite material which process comprises the following steps:
   (a) applying adhesive to the external surface of a metal connector to which material of the pipe is to be adhered;
   (b) after drying the adhesive on the metal connector, placing a film of elastomer over the adhesive;
   (c) in a chamber, in which the connector from step (b) is placed, vulcanizing the elastomer of the film and curing the adhesive ;
   (d) applying a layer of adhesive to the surface of the elastomer film;
   (e) after drying the adhesive, forming a pipe over the external surface of the elastomer film by application of layers of not yet polymerised composite material;

2. Process according to claim 1 wherein, the composite material of the pipe from step (e) is pre-polymerised in a chamber.

3. Process according to claim 1 wherein the drying of the adhesive in steps (a) and (d) is carried out in the absence of dust.

4. Process according to claim 1 wherein a vacuum is created and maintained in the said chamber during the whole of the said step (c).

5. Process according to claim 1 wherein the said adhesive used during steps (a) and (d) is of epoxy type.

6. Process according to claim 1 wherein at the end of step (d) the said metal connector is placed on a mandrel.

7. Process according to claim 1 wherein, to the internal wall of a casing, there is applied a second film of an elastomer according to the same steps (a), (b) and (c).

8. Process according to claim 7 wherein the said casing is constituted by a plurality of segments.

9. Process according to claim 7 wherein adhesive is applied to the internal surface of the said second film and allowed to dry.

10. Process according to claim 9 wherein the said adhesive is of epoxy type.

11. Process according to claim 9 wherein, after the drying, the said casing is placed around the pipe at the level of the said metal connector and held solidly on the said connector.

12. Process according to claim 11 wherein the said casing is held solidly on by means of a locking ring.

13. Process according to claim 11 wherein the said casing is held solidly on by means of circumferential winding of a band.

14. Process according to claim 1 wherein the said pipe carrying at least one metal connector is placed in a chamber for polymerisation.

15. Process according to claim 11 wherein the said pipe carrying at least one metal connector is placed in a chamber for polymerisation.

16. Pipe of composite material having fixed thereto at least one metal connector, a first film of an elastomer interposed between the said pipe and the said metal connector, the first film of an elastomer adhering to the said pipe and the said metal connector, a second film of an elastomer interposed between the said pipe and a casing which surrounds the said pipe at the level of the said metal connector.

17. Pipe according to claim 16 wherein the said second film of an elastomer adheres to the internal wall of the said casing and to the external surface of the said pipe.

18. Pipe according to claim 17 wherein the said adherence is effected by an adhesive.

19. Pipe according to claim 18 wherein the said adhesive is of epoxy type.

20. Pipe according to claim 16 wherein the said casing is constituted by a plurality of segments.

21. Pipe according to claim 16 which comprises a band about the said casing.

22. Pipe according to claim 16 wherein a locking ring holds the casing solidly on the corresponding metal connector.

* * * * *

UNITED STATES PATENT AND TRADEMARK OFFICE
CERTIFICATE OF CORRECTION

PATENT NO. : 4,549,919
DATED : October 29, 1985
INVENTOR(S) : Marcel AUBERON et al It is certified that error appears in the above-identified patent and that said Letters Patent is hereby corrected as shown below:

On the cover page, Item [30], "July 6, 1982" should read --July 6, 1981--.

Signed and Sealed this

Sixteenth Day of September 1986

[SEAL]

Attest:

DONALD J. QUIGG

Attesting Officer

Commissioner of Patents and Trademarks